Aug. 4, 1936. W. D. LA RUE 2,050,008
PHONOGRAPH
Filed Aug. 15, 1930 6 Sheets-Sheet 1
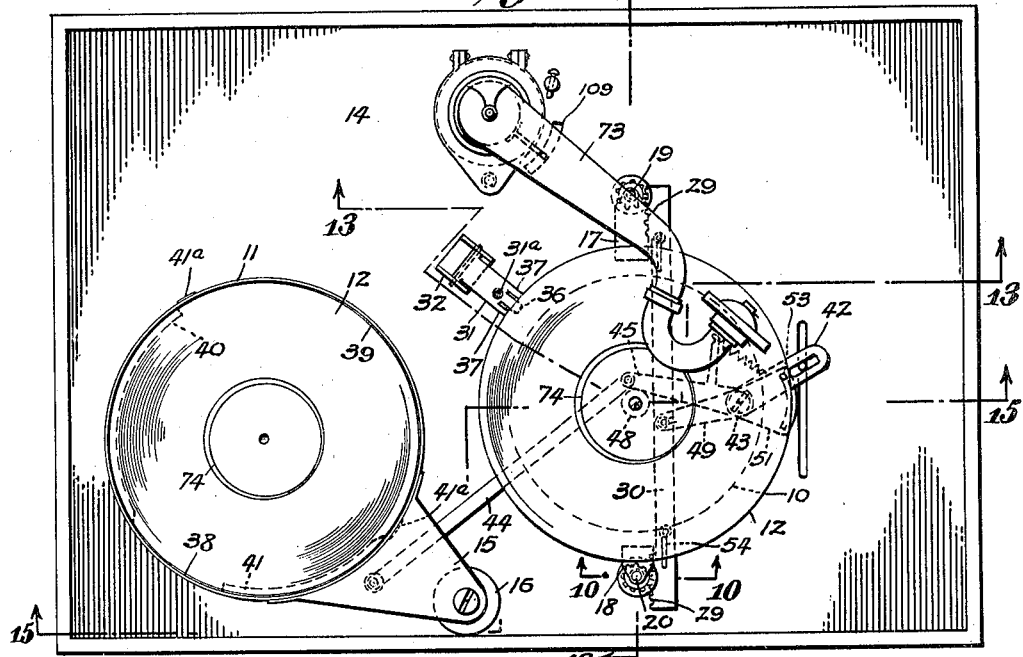
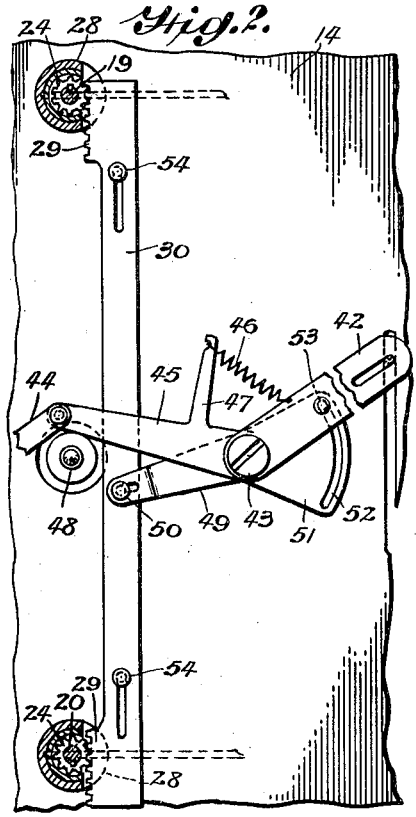
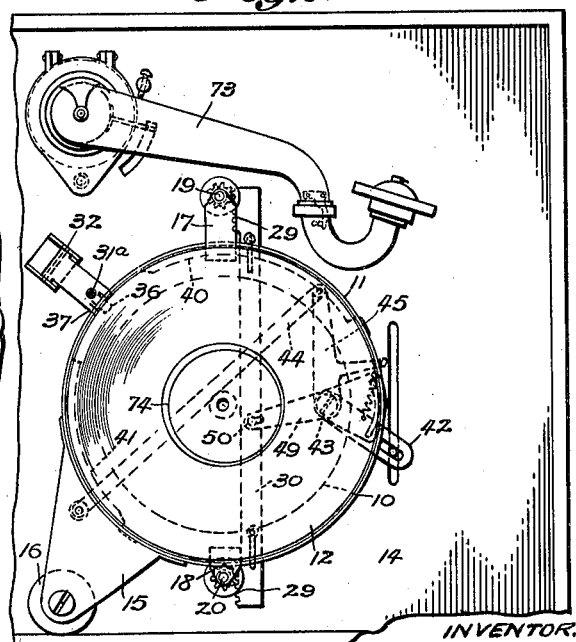
INVENTOR.
William D. La Rue,
by T. R. Goldsborough
His Attorney.

Aug. 4, 1936.  W. D. LA RUE  2,050,008
PHONOGRAPH
Filed Aug. 15, 1930  6 Sheets-Sheet 2

INVENTOR.
William D. LaRue,
by T. R. Goldsborough
His Attorney.

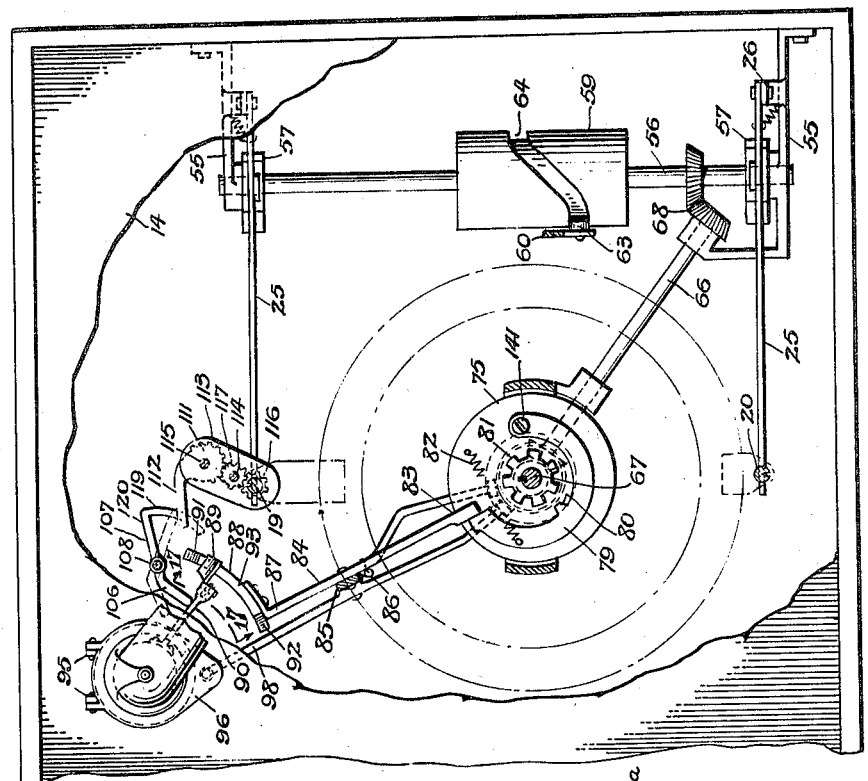

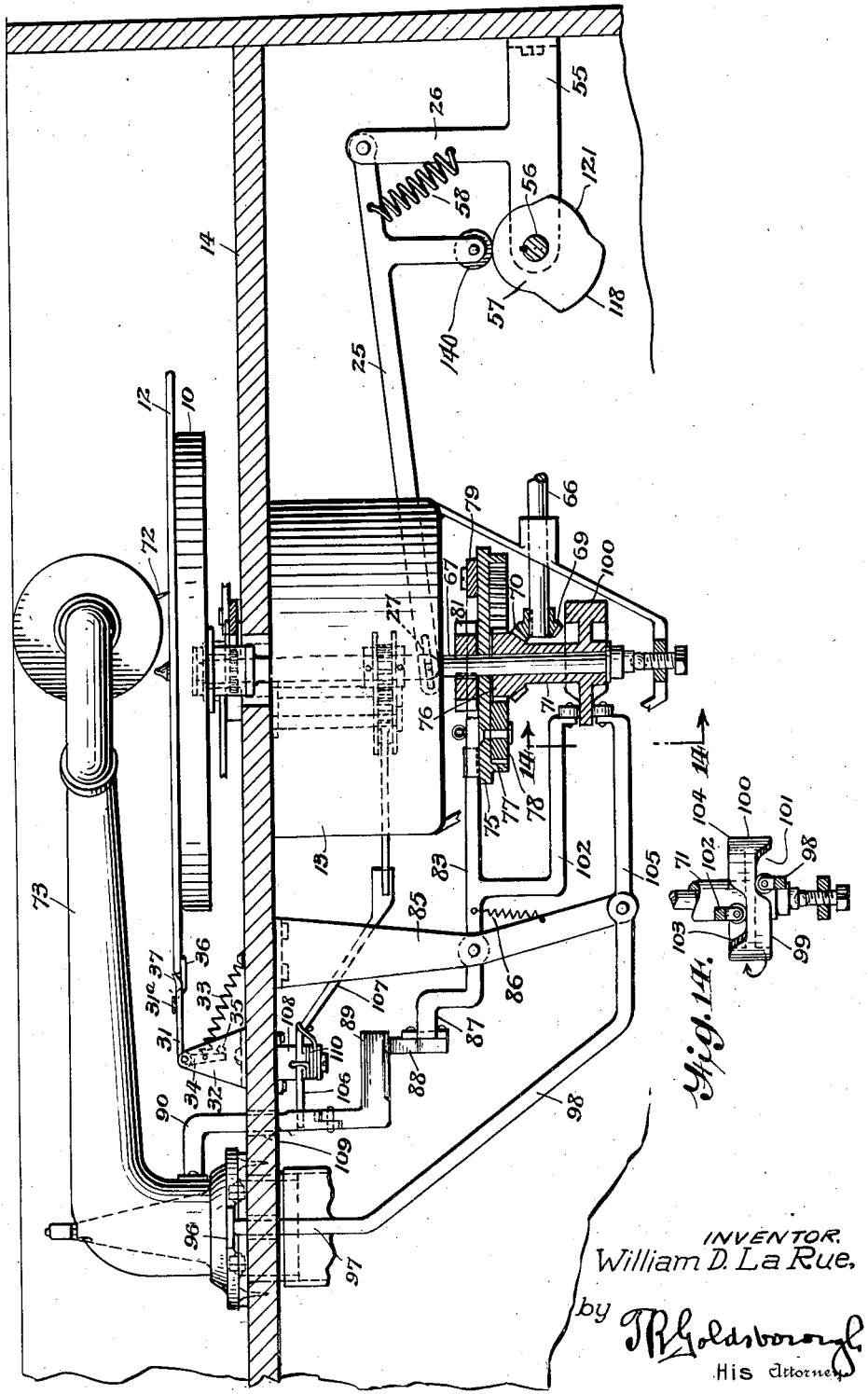

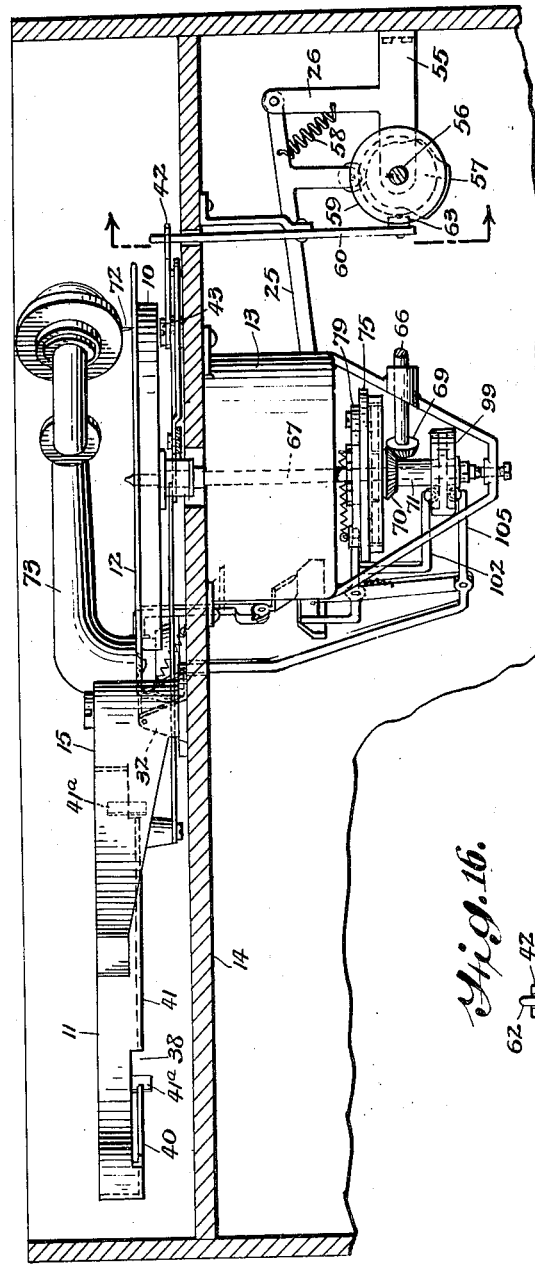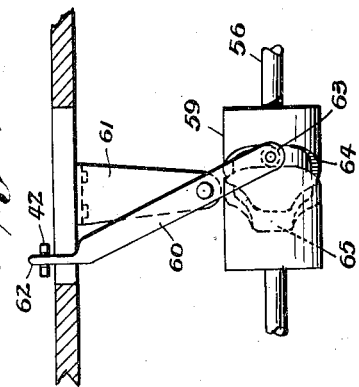

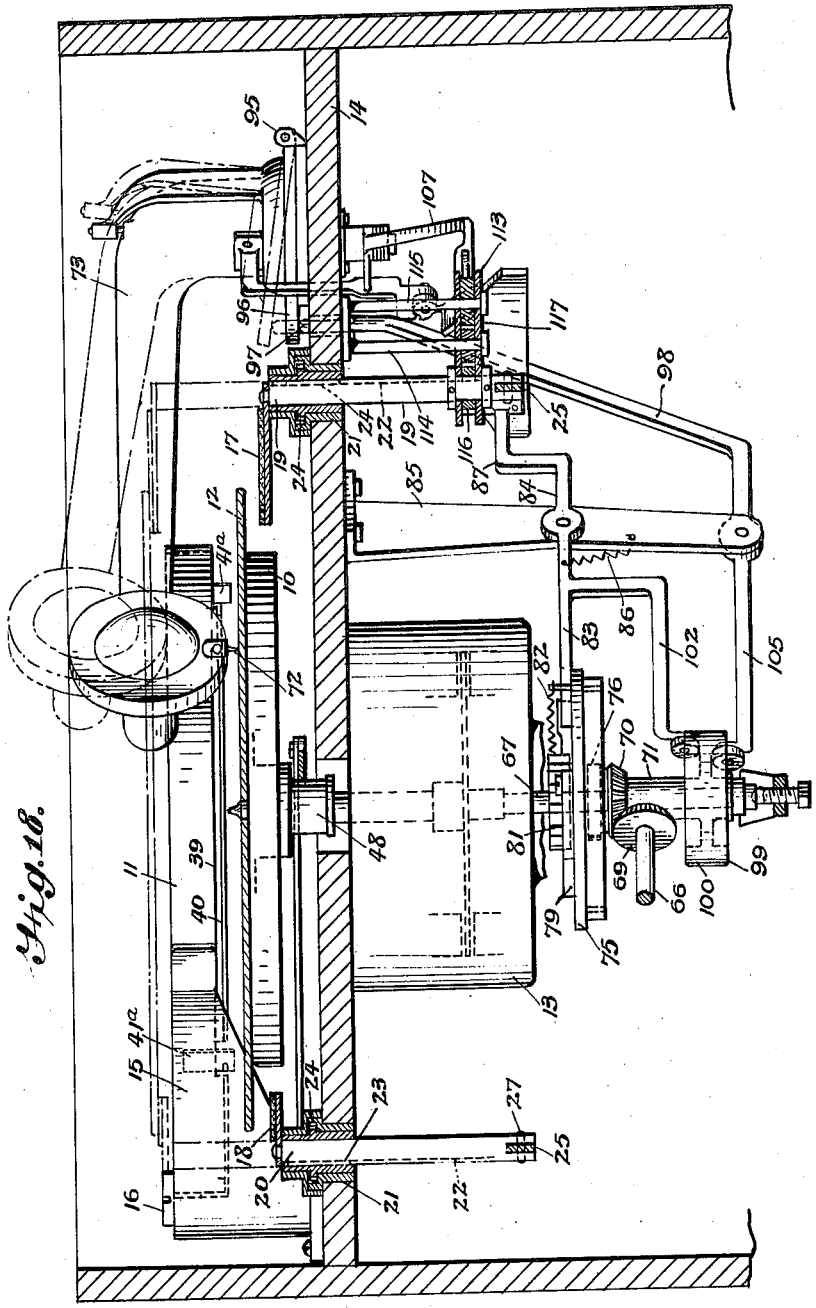

Patented Aug. 4, 1936

2,050,008

UNITED STATES PATENT OFFICE 2,050,008

PHONOGRAPH

William D. La Rue, Merchantville, N. J., assignor, by mesne assignments, to Radio Corporation of America, New York, N. Y., a corporation of Delaware Application August 15, 1930, Serial No. 475,438

31 Claims. (Cl. 274—10)

My invention relates to phonographs and it has particular relation to phonographs of the type comprising mechanism whereby a plurality of records may be sequentially played without attention on the part of an operator.

Automatic phonographs constructed according to the teachings of the prior art are, in general unsatisfactory in operation for the following reasons:

1. The mechanism scratches the records and in many instances causes their breakage.

2. Most prior art machines are so constructed that the unplayed records are kept in one magazine while the played records are deposited in a discard-hopper, necessitating the re-charging of the first mentioned magazine after all of the records have been played.

3. Substantially all other automatic phonographs with which I am familiar are noisy in operation and comprise a large number of mechanical parts that are expensive to manufacture.

4. Few, if any, automatic phonographs constructed previous to my invention were capable of satisfactorily re-playing a single record a plurality of times.

It is accordingly an object of my invention to provide an automatic phonograph that shall be substantially free from the defects enumerated above.

Another object of my invention is to provide mechanism for accomplishing the transfer of disc like articles, such as phonograph record tablets, between two positions, as between a stack and a playing position, which is improved and simplified as compared with known mechanisms for this purpose.

Another object of my invention is to provide effective mechanism for transferring records, between a magazine and a playing position, which will be simple in construction and which may be incorporated in phonograph machines without materially increasing the cost thereof.

Another object of my invention is to provide, in connection with a phonograph machine, mechanism for transferring record tablets between a magazine and the turntable of the machine, in which the magazine functions cooperatively with other related mechanism for making the transfer.

Another object of my invention is to provide, in connection with a phonograph machine having a turntable, a magazine for supporting, clear of the turntable, a stack of records to be played seriatim on the turntable, and adapted for coaction with other mechanism of the machine for transferring records between itself and the turntable.

Another object of my invention is to provide a phonograph machine having a turntable and a magazine, the latter being adapted for supporting a stack of records in a position remote from the turntable, and operable to convey the records therein from said remote position to a position for transfer to the turntable; said magazine being adapted to cooperate with other mechanism of the machine in making said transfer.

A further object of my invention is to provide mechanism for reciprocating a record magazine to and from a position coaxially above a turntable and mechanism coacting with the magazine and rendered effective by its movement for removing a record from the bottom of the magazine and causing it to be deposited on the turntable.

A further object of my invention is to provide, in a mechanical organization having a record magazine movable to and from a record playing position, mechanism for both transferring a record from the magazine to playing position and a record from the playing position to the magazine incident to portions of a single movement of the magazine to and from playing position.

A further object of my invention is to provide, in mechanism for transferring records from a magazine to a turntable and including a magazine movable from a position remote from and clear of a record on the turntable to a position above the turntable and back again to the remote position, mechanism whereby a record is placed on top of a stack in the magazine and a record is removed from the bottom of said stack, both during portions of the same cycle of movements of said magazine.

A further object of my invention is to provide, in a phonograph mechanism which includes a turntable and a magazine movable to and from position to receive a record from the turntable, means for effecting delivery of the record from the turntable to the magazine and a common control for the several mechanisms so related thereto as to cause the various transfer movements to take place in their proper sequence.

A further object of my invention is to provide mechanical means for removing records from a turntable and for delivering the same to a magazine, which means includes mechanism for moving the magazine to a position adjacent to the turntable suitable for delivery of a record thereto and mechanism for removing the record from the turntable and elevating it to a position above the plane of the magazine; said mechanical means including a common control movable a distance for moving the magazine to said position and further movable to effect the discharge of a record into said magazine.

A further object of my invention is to provide, in combination with a turntable and a magazine movable to and from a position adjacent to the turntable, means for transferring a record from the turntable to the top of the magazine while the latter is in the position adjacent to said turntable.

A further object of my invention is to provide, in combination with a turntable and a magazine reciprocably movable to and from a position coaxial with the turntable, means synchronized with the movements of the magazine, whereby a record is removed from the turntable and delivered to the top of the magazine while the magazine is in coaxial relation to the turntable.

Another object of my invention is to reduce the time of record transfer between a record supporting magazine and a turntable to a minimum.

A further object of my invention is to provide mechanism whereby the period of time elapsing between the playing of succeeding records delivered seriatim from a supply to a turntable may be reduced compared with that for known mechanism for the purpose of making such transfer.

A further object of my invention is to decrease the time elapsing between the mechanical removal of one record from a turntable and the delivery of a succeeding record to said turntable as compared with that for known mechanism for this purpose.

A still further object of my invention is to provide an automatic phonograph that shall be capable of repeatedly playing a single record any desired number of times.

A still further object of my invention is to provide, in a phonograph organization having a turntable, mechanism operating through a cycle for transferring a record to and fro between a turntable and a magazine, the operation thereof being such that the same record may be transferred from the turntable to the magazine and back again to the turntable during the same cycle of movements of the record transfer mechanism.

As is well-known to those skilled in the art to which my invention pertains, an automatic phonograph must, of necessity, include a plurality of mechanisms whereby the following operations may be accomplished:

1. Connecting of the automatic mechanism to the prime mover.
2. Lifting of the tone arm and needle from a played record.
3. Swinging of the sound box out of the way of the played record.
4. Discarding the played record.
5. Depositing a new record.
6. Swinging the tone arm into playing position.
7. Letting the tone arm down into contact with the record at the proper point thereon, and
8. Disconnecting of the automatic mechanism from the prime mover.

Since the prior art discloses a wide variety of mechanical movements whereby the above described sequence of operations may be accomplished, it is to be clearly understood that the specific mechanisms I have chosen for that purpose and hereinafter described in detail are not to be construed as limitations upon my invention.

An embodiment of my invention, as herein set forth and in accordance with the above objects, comprises a turntable in record playing position, a magazine for supporting a plurality of records to be played seriatim and having a reciprocatory travel between a position remote from the turntable and a position adjacent thereto convenient for the reception of records therefrom (in the present embodiment the magazine moves to and from a position coaxial with the turntable), mechanism for effecting the transfer of a record from the turntable to the magazine synchronized with the movements of the magazine, and means operable incident to said movement for transferring a record from the magazine to the turntable, both of said transfers being made during portions of a single cycle of to and fro movements of the magazine.

The mechanism for effecting the transfer of records from the turntable to the magazine may include elevator means for removing a record from the turntable and elevating it to a position above the plane of the magazine, and operable, when so elevated and when the magazine is in suitable position for receiving the record, to be rotated to discharge the record into the magazine.

The mechanism for effecting transfer of a record from the magazine to the turntable includes means adapted for cooperation with the magazine during movement thereof toward the turntable to automatically dislodge a record from the magazine onto the turntable after a played record has been removed therefrom and is shown in the present embodiment as a finger adapted to project through an opening in the lower edge of the magazine wall for engaging the lowermost record and dislodging it through the open bottom of the magazine and an oppositely positioned opening in the bottom edge of the wall.

The movement of the magazine to and from position adjacent to the turntable and the discharge movements of the record elevators is effected by suitable mechanism including a common control and the discharge of the record from the elevators is subsequent to movement of the magazine into record receiving position adjacent to the turntable. This sequence of movements is made possible by provision, in connection with the control, of a suitable delayed movement of mechanism which may comprise a resiliently extensible connection of the control with magazine actuating mechanism and a pin and slot connection between the control and a pivoted lever which is in turn operatively connected with suitable means for rotating the elevators.

Actuating mechanism, by which the above outlined mechanism and the various elements of the phonograph are automatically operated in timed relation to each other are provided, the specific details of which constitute no part of the present invention.

Other objects of my invention will become evident from the following detailed description, taken in conjunction with the accompanying drawings, in which:

Fig. 1 is a plan view of a phonograph cabinet showing automatic record disc transfer mechanism according to this invention in relation to a turntable and tone arm, the tone arm being shown in playing position with respect to the outermost turn of the groove of a record on the turntable and the record magazine being shown in remote position.

Fig. 2 is a fragmentary detail view on an enlarged scale of certain of the transfer mechanism related to record elevating means, which latter is shown in section.

Fig. 3 is a view similar to Fig. 1 (part of the cabinet being broken away) showing the magazine in coaxial relation to the turntable with records therein, and the tone arm in remote position clear of the turntable. Both Figs. 1 and 3 show the record elevator arms in position beneath a record; Fig. 1 at the lower limit of their travel, Fig. 3 at the upper limit.

Figure 4:
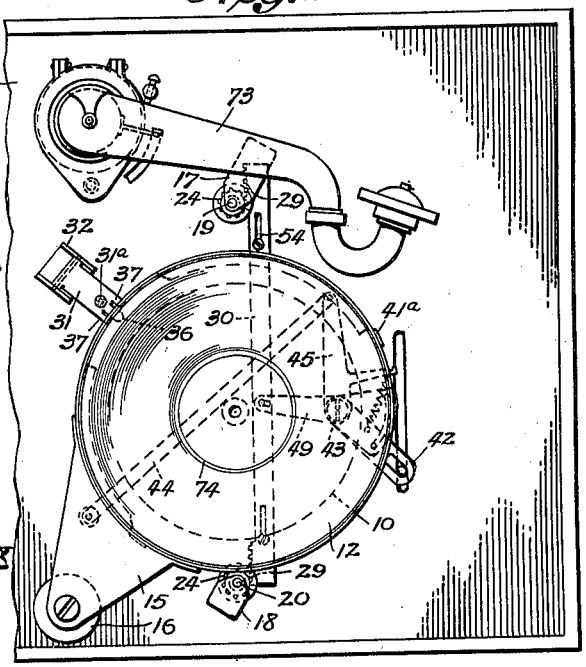

Fig. 4 is a plan view similar to Fig. 3 and shows the elevator arms turned to record discharging position.

Figure 5:
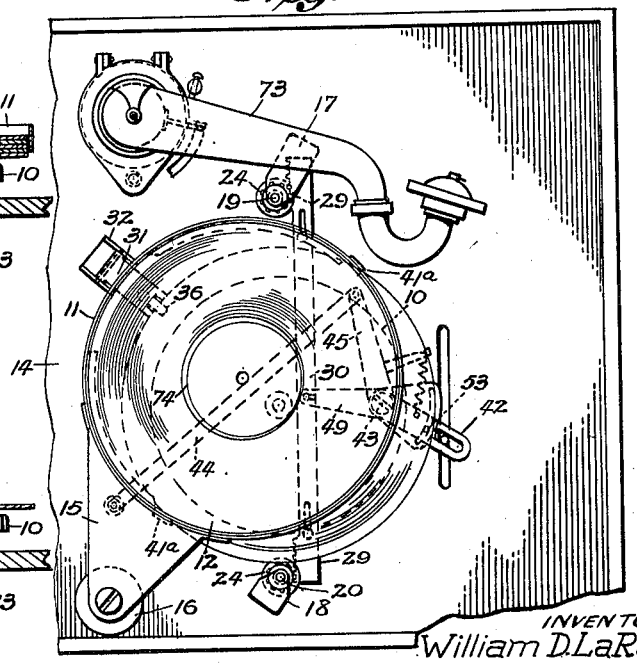

Fig. 5 is a view similar to Fig. 3 and shows a record being discharged from the magazine onto the turntable during the initial movement of the magazine in returning to its remote position.

Figure 6:
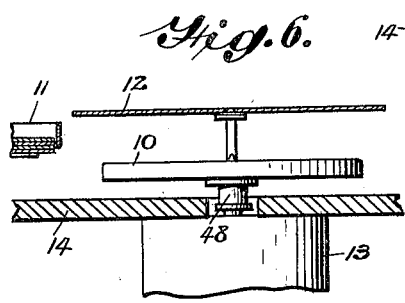

Fig. 6 is a fragmentary view in section of the turntable, a record elevated thereabove and above the plane of the magazine, the magazine being about to be moved beneath the suspended record.

Figure 7:
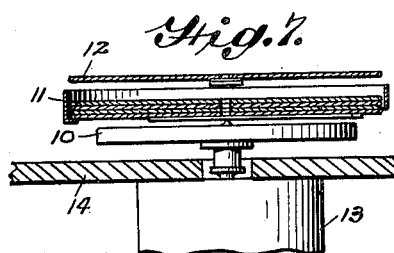

Fig. 7 is a view similar to Fig. 6, showing the magazine beneath the elevated record.

Figure 8:
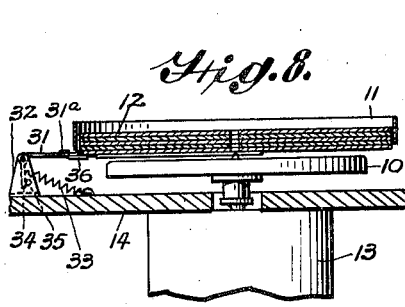

Fig. 8 is a view similar to Fig. 6, showing the record discharging finger in engagement with the lowermost record in the magazine.

Figure 9:
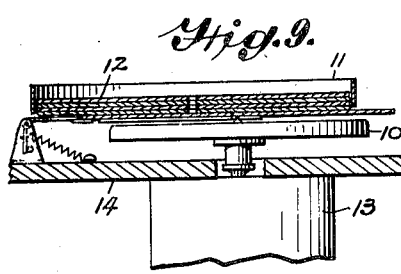

Fig. 9 is a view similar to Fig. 8, showing the record partially ejected from the magazine. This view shows the record discharging mechanism in a similar position to that of Fig. 5.

Fig. 10 is an enlarged fragmentary section on the line 10—10 of Fig. 1, showing the construction of one of the elevator members and related actuating mechanism.

Fig. 11 is a perspective of the record magazine.

Fig. 12 is a plan view of the cabinet similar to Fig. 4 on an enlarged scale compared with Fig. 4, and having part of the motor board broken away to show actuating mechanism located thereunderneath.

Fig. 13 is a section on line 13—13 Fig. 1.

Fig. 14 is a section on line 14—14 Fig. 13, showing, in detail, the unitary construction of a tone arm raising cam and the record transfer cycle controlling cam.

Fig. 15 is a section on line 15—15 Fig. 1, the elements being in the same position as in Fig. 13.

Fig. 16 is a section on line 16—16 Fig. 15 showing in detail the drum cam for controlling movements of the magazine and elevator members.

Fig. 17 is a section on line 17—17 Fig. 12, showing in detail the construction of a part of the clutch trip mechanism.

Fig. 18 is a section on line 18—18 Fig. 1 at right angles to Figs. 13 and 15.

The apparatus as shown in the drawings comprises a phonograph mechanism including a turntable 10 in playing position and a magazine 11 located above a motor board 14, the magazine being adapted to carry a plurality of record tablets 12 to be delivered to the turntable and played seriatim together with suitable transfer mechanism for transferring records from the turntable to the top of a stack within the magazine, mechanism for transferring records from the magazine to the turntable, and mechanism for operating the various elements enumerated, as will be hereinafter more fully set forth.

The turntable 10 may be continuously rotated, as by motor 13 located beneath and attached to the motor board 14, and the magazine 11 is mounted for movement to and from position adjacent to the turntable. To this end, the magazine is preferably swingably mounted by a bracket arm 15 pivoted on a post 16 secured to the motor board in a position sufficiently remote from the turntable to permit the magazine to swing clear of a record placed on the turntable, and so that the magazine may be swung to a position for receiving records from the turntable (in the present embodiment to a position coaxial with the turntable) and back again to its position remote from the turntable.

The record transfer mechanism referred to above may comprise supporting arms 17 and 18 which may be flat, lateral extensions from shafts or pins 19 and 20, respectively, constituting therewith elevators, the shafts 19 and 20 being vertically slidable through bushings 21 mounted in the motor board and being provided with keyways 22 formed longitudinally therein for the reception of lugs 23 extending interiorly from rachet wheels 24 which are journaled within the bushings so as to encircle the shafts 19 and 20.

The elevator shafts 19 and 20 are raised by suitable means, as cam operated levers 25 pivotally supported beneath the motor board by arms 26 extending from brackets 55 hereinafter described, the shafts being suitably connected with the levers, as by a pin and slot connections shown at 27.

In order that the arms 17 and 18 may be rotated to and from position beneath a record tablet for removing the same from the turntable and delivering the same to the magazine, the bushings 21 are notched, as at 28, to accommodate racks 29 formed on a rack bar 30, adjacent to the ends thereof, and adapted to coact with the toothed rachet wheels 24. Movement of the rack bar in one direction moves the supporting arms 17 and 18 to position beneath a record, and in its opposite direction to position for disengaging the same from the record as will be clear from Figs. 1, 2 and 4 of the drawings, the latter movement permitting the record to gravitate into the magazine.

It will be noted that the arm more remote from the pivot axis for the magazine is made sufficiently longer than the more adjacent arm in order to accommodate the swing of the magazine and that the two arms are so related to their actuating means as to turn in opposite directions for each movement of the bar 30.

In the mechanism herein disclosed, provision is also made for delivering records from the magazine to the turntable coincident with a portion of the cycle of movements of the magazine.

This means may be comprised of a finger between which and the magazine there is relative movement and which is adapted to project into the magazine during a portion of said relative movement for dislodging a record tablet therefrom. Such a finger is shown at 31 as being pivoted at one end to a bracket 32 secured to the upper side of the motor board and held with its free end yieldably elevated into the path of the lowermost record in the magazine by a resilient member, as a spring 33 connected between the motor board and an arm 34 extending at an angle to the finger 31. A suitable stop 35 is provided in the path of arm 34 for limiting the upward movement of the finger 31 under influence of the spring 33 so as to prevent its elevation above the plane of the lowermost record in the magazine.

The yielding mounting of the finger permits of its depression during the forward movement of the magazine which causes it to move into record engaging position after the magazine has moved to coaxial alignment with the turntable. In the forward movement of the magazine, that is toward coaxial relation with the turntable, the finger 31 drags on the surface of the bottom record and is, for this reason, provided on its upper surface with a small pad 31ᵃ of felt, plush or other suitable material, to prevent scratching or otherwise marring of the record.

The finger 31 is provided centrally at its free end with a depressed portion 36 adapted to extend under and in contact with the record to be dislodged, and with side portions 37 in the plane of the finger, or slightly turned upward therefrom, adapting them to abut against the edge of the lowermost record in the magazine, the portion 36 holding portions 37 in proper abutting relation to said edge against the influence of the spring 33.

The magazine 11 is open bottomed and is provided with suitable opposed cutaway portions 38 and 39 in the lower portion of its vertical wall, one of which serves to permit engagement of the lowermost record in the magazine by the finger 31 and the other, which is the wider of the two, to permit disengagement of the record from the supporting flanges 40 and 41 extending interiorly from the lower edge of the magazine wall as shown in full lines in Fig. 11, and dotted in other figures. The cutaway portions and the open bottom of the magazine afford a free path for the relative movement of the finger 31 through the magazine between the flanges.

In order to more positively guide the record being discharged onto the turntable, the magazine wall is provided, adjacent to the cutaway 39 and at the edges thereof, with guide tabs 41ᵃ which project below the bottom of the magazine to direct and limit the course of the record as it is dislodged from the magazine onto the turntable.

The magazine is reciprocated between its position adjacent to the turntable and its position remote therefrom through the instrumentality of a control lever 42 pivoted to the motor board as by a screw bolt 43 and connected to the magazine through links 44 and 45 and a spring 46. The link 44 is pivoted at one end to the magazine bracket arm 15 and at its other end to the link 45 which in turn is pivoted on the bolt 43, operative yielding connection between the control lever 42 and the link 45 being effected through the spring 46 connected at one end to the lever and at its other end to arm 47 on link 45.

By means of this yielding connection, movement of the control lever beyond its limit for bringing the magazine coaxially above the turntable is permitted for a purpose which will presently appear, the magazine being stopped in said coaxial position in any suitable manner as by contact of one of the links, as link 44, with a suitable abutment as the turntable hub 48. The magazine may also be stopped in its remote position by contact of the link 45 with said abutment.

As indicated above, the arms 17 and 18 are adapted to be rotated, through the movement of the rack bar 30, to and from supporting engagement with a record. The rack bar, in turn, is actuated by to and fro movements of the control lever 42 through a lever arm 49 pivoted intermediate of its ends to the motor board, as by screw bolt 43, one of the ends of the lever 49 being connected with the rack bar 30, as at 50, and its other end being flared into a sector 51 having an arcuate slot 52 concentric with the bolt 43. Suitable means, as a lug 53 on the lever 42, is made to ride freely in this slot for causing movement of the rack bar 30 through the lever arm 49 when, and only when, the ends of the slot are reached by the lug.

It will thus appear that the angular movement of the control lever 42 in opposite directions will effect a corresponding reversing of movement of the magazine and will cause a delayed rotary movement of the arms 17 and 18 corresponding to the movement of the magazine to and from position over the turntable to respectively disengage the arms from a record supported thereby and to position the arms beneath a record on the turntable.

The rack bar 30 is slidably connected with the motor board 14 by a slot and pin connection as indicated at 54.

The above described mechanism may be actuated in any suitable manner, preferably by control mechanism set into operation automatically at the completion of the playing of each of the record tablets delivered from the magazine to the turntable and of such organization that the various steps in the operation will occur automatically and in their properly timed sequence.

Suitable mechanism for this purpose is illustrated in the drawings in connection with the above described mechanism but constitutes no part of the present invention except in that it provides mechanism whereby the movements of the hereinbefore described mechanism may be automatically effected in properly timed relation to each other, and whereby a construction may be set forth complete in its cycle of operations.

Journaled to the underside of the motor board 14 in brackets 55 is a cam shaft 56 having cams 57 secured thereto for operating the levers 25 which are pivotally supported at one end, as hereinbefore stated, by arms 26 extending from brackets 55 and having rollers 140 mounted on suitable extensions therefrom, which rollers ride on the surfaces of the cams 57 to raise and lower the pins 19 and 20, thereby alternately elevating arms 17 and 18 above the plane of the magazine 11 and retracting them to a plane below that of the turntable at suitable times during the record transfer cycle. The rollers may be held in engagement with the cam surfaces, as shown, by means of springs 58.

Suitable means is provided for operating the control lever 42, such as the drum cam 59 shown in Fig. 16 as fixed on cam shaft 56. This cam 59 serves to actuate control lever 42 through the instrumentality of a lever 60 pivoted intermediate of its ends to a bracket 61, one end of the lever 60 being suitably connected with said control lever, as at 62, and the other end thereof being provided with an antifriction means, as roller 63, riding in a groove 64 suitably formed in the surface of the drum for causing a reciprocal movement of levers 60 and 42.

The several cam surfaces are so constructed and related to each other as to cause the several movements of the elevator pins and magazine in properly timed sequence to effect the transfer of records from the turntable to the magazine and from the magazine to the turntable, as indicated above. The cam groove 64 is provided with portions for causing advance and retracting movements of the roller 63 and with a dwell 65 between said portions to allow time for the depositing of a record into the magazine between these two movements.

The shaft 56 may be driven from the motor 13 through suitable means, as a shaft 66 journaled to the motor board and geared both to the shaft 56 and the motor shaft 67 on which the turntable 10 is mounted, the drive connection between the shafts 56 and 66 being by means of suitable gears shown at 68, and the connection of the shaft 66 with the motor shaft being through gears shown at 69 and 70, respectively, fast to the shaft 66 and to a hollow shaft 71 which is loosely mounted on motor shaft 67, suitable clutch mechanism being provided, as will hereinafter be described, for effecting a driving connection between the motor shaft 67 and the hollow shaft 71 when the stylus 72, carried by the tone arm 73, has completed its sound reproducing travel in the record groove.

Where a record, such as shown on the turntable at 12 in Fig. 1 of the drawings, is provided at the center with an eccentric groove 74, the clutch mechanism for effecting this driving connection and a control therefor from the tone arm similar to that disclosed in my co-pending application, Serial No. 332,689, filed Jan. 15, 1929, may be used, the nature of which is briefly as follows:

A disc 75 is provided loose on the motor shaft 67 and in driving connection with the hollow shaft 71 through planetary reducing gears which may conveniently comprise a sun gear 76 on hollow shaft 71 coacting with a ring gear 77 and a planetary gear 78 secured to the disc 75, the latter being rotatable thereon and of the same diameter as gear 76. The planetary gear 78 meshes both with gear 76 and 77, with the latter in preferably a 15 to 1 relationship so as to effect suitable reduction in speed of the cycle of movements of the record transfer mechanism compared with the rotation of the turntable.

Driving connection is effected between disc 75 and shaft 67 by means of the clutch crescent 79 pivoted to the disc, as at 141, and having a lug 80 thereon adapted to engage in any one of the several notches in the spider 81 secured to the motor shaft 67 for rotation therewith. The lug 80 on the crescent 79 is urged toward engagement with the spider by the spring 82, and is held out of engagement therewith during the playing of a record by a dog 83 constituting one arm of a lever 84 pivoted to a suitable supporting bracket 85 and engaging with the end of the crescent under influence of the spring 86.

The other arm 87 of the lever 84 is provided at its free end with a member 88 extended transversely thereof and which coacts with a pawl 89 pivotally supported by an arm 90 extending from the tone arm 73 and rigid therewith. The member 88 has end surfaces 91 and 92 at its respective ends inclined to an intermediate surface 93, the surface 91 assisting the pawl to ride up onto the surface 93 and the surface 92 functioning as will herein presently appear.

The pawl 89 and the supporting arm 90 are, together, of such length that the pawl will drag on the intermediate surface 93 of member 88 at an angle to the arm 90 and is constructed so as to assume this relationship to the arm when passing over said intermediate surface during the playing movement of the tone arm.

Upon the reversal of this movement, however, the pawl will straighten into alignment with the arm and will be prevented from assuming an angle thereto in the opposite direction by contact of an extension 94 on the pawl with the arm 90. Downward pressure is therefore exerted by the pawl 89 upon member 88 depressing the same as the pawl rides up incline 92, disengaging the dog 83 from the end of crescent 79 and permitting the lug 80 to engage a notch in the spider 81 under influence of spring 82.

Immediately upon the engagement of the lug 80 with the notch of the spider, the hollow shaft 71 and cam shaft 56 will be rotated and, through suitable instrumentalities, the tone arm 73 will be raised to disengage the stylus 72 from the record, permitting the arm to rotate under the influence of gravity to a position clear of the turntable.

In order that the tone arm may be so elevated, the same may be hingedly secured on the side thereof away from the turntable to the motor board, as at 95, there being an extension 96 opposite the hinges against which a vertically slidable pin 97 on the end of one arm of a lever 98 pivoted to supporting bracket 85 may act. The lever 98 is actuated by a cam surface in the nature of an annular ridge 99 formed on the under surface of a cam wheel 100 for raising the pin 97 and thereby canting the tone arm to an angle effective for causing it to rotate under influence of gravity to a position clear of the turntable and a record thereon. The ridge 99 is provided with a notch 101 which accommodates the end of the lever arm 98 adjacent its arm portion 105 when inactive.

As the said end of the arm rides up out of the notch, the tone arm is raised and is maintained raised until the cam wheel 100 has made a complete rotation on its axis. Cam wheel 100 may, as shown, be integrally formed with the hollow shaft 71 or otherwise attached thereto as desired.

In order that the clutch mechanism including crescent 79 and spider 81 may remain effective throughout the record transfer cycle and until the tone arm is again brought to playing position, a branch arm 102 is provided on one arm of lever 84 which, when said arm is disengaged from the end of the crescent, will be lifted out of a notch 103 and onto an annular ridge 104 similar to the ridge 99 provided on top of a cam wheel 100 and in which the notch 103 is formed. The extent of these ridges and the speed of rotation of the wheel 100 are such that the arm 105 of the lever 98 and branch arm 102 respectively ride thereon during the entire cycle of record transfer movements, thereby holding the dog 83 out of engagement with the end of the crescent clutch and the tone arm raised during the said cycle.

The movement of the tone arm under the influence of gravity may be limited in any suitable manner, as by contact of the arm 90, rigid therewith, with one arm 106 of a lever 107 which is pivoted intermediate its ends to a suitable support 108 or against the end of a slot 109 in the motor board 14 and in which the arm rides. A spring 110, connected by its ends to support 108 and to the lever 107, tends to hold the lever in tone arm limiting position and may be of sufficient tensile strength to maintain the lever in its limit position against the pressure of the tone arm thereagainst but yielding enough to permit its rotation on the pivotal support as will hereinafter be set forth.

In addition to acting as a stop for the tone arm, the lever 107 has the special function, in connection with mechanism actuated through the movements of the elevator shafts 19, of returning the tone arm to its playing position in the outermost sound groove of a record deposited on the turntable during the cycle of record transfer movements.

The position of this lever at the end of its movement for bringing the tone arm to this playing position is shown in Fig. 12, in full lines, its limiting position under influence of spring 110 being shown dotted.

The mechanism through which this lever is moved from dotted to full line position by the elevator shaft 19 with which it is associated consists of a sector 111 provided with an arm 112, the sector being mounted in a carriage 113 which is carried by one of the shafts 19 so as to afford relative rotation therebetween, the carriage being also vertically slidable on spaced shafts 114 and 115 projecting from the underside of the motor board. By this construction, free movement of the carriage up and down with the said shaft 19 is provided and rotary movement with the said shaft is prevented. The shaft 19 has a pinion 116 keyed thereto in driving connection with sector 111 through an idler 117 journaled in the carriage, so that movement of the arms 106 and 17 will be simultaneously toward the turntable bringing the arm 17 beneath a record deposited on the turntable and the tone arm to playing position both at the same time. There may be a reducing gear relation as shown between the shaft 19 and the sector 111, since arm 17 rotates through a wider angle than is necessary for bringing the tone arm 73 from remote to playing position.

The sequential steps of operation of the record transfer mechanism will take place in the following order and manner, considering the stylus as having finished the playing of a record and as having ridden into the eccentric groove 74 thereof: With the continued rotation of the turntable, the movement of the tone arm will be reversed, causing the pawl 89 to engage with the incline 92 which causes disengagement of dog 83 from the end of the crescent clutch 79, allowing the same to engage spider 81, thereby setting into operation the cycle of movements by which the record transfer both from the turntable to the magazine and from the magazine to the turntable is accomplished.

When the clutch members are thus engaged, hollow shaft 71 will rotate with the motor shaft 67 at a reduced speed, and cam shaft 56 will be rotated through the intermediary of shaft 66 connecting shaft 56 with hollow shaft 71. Rotation of cam wheel 100, fast on hollow shaft 71, will operate lever 98, raising the tone arm, which, when the stylus 72 is disengaged from the record groove, will rotate under influence of gravity to a remote position clear of the record on the turntable where it will be stopped by engagement of arm 106 with lever 107. In timed relation with this step and subsequent thereto, the rise 118 on cams 57 will become effective, raising pins 19 and 20 through levers 25, carrying the record disc then on the turntable to a position elevated above the plane of movement of the magazine 11.

The groove 64 in the drum cam 59 is so related to the rise on cams 57 as to become effective for operating control lever 42 to swing the magazine 11 into coaxial relation with the turntable immediately after the elevation of the record to this position. The movement of the lever 42 is accomplished through lever 60 which is swung about its pivot by movement of roller 63 in groove 64, and the movement of lever 42 is communicated to the magazine through links 44, 45 and spring 46, as hereinbefore set forth.

After the magazine has been brought to its position coaxially above the turntable, the lever 42 will be permitted to advance further against the force of spring 46 and will cause operation of lever arm 49 to move the rack bar 30, thus rotating the arms 17 and 18 from beneath the suspended record to the position as shown in Figs. 4 and 5, allowing the record to drop into the magazine, the dwell 65 in the drum cam groove affording time for this operation.

Subsequently to this, the drop from rise 118 on cams 57 will allow the levers 25 to recede, carrying the pins 19 and 20 to their lowermost position.

The magazine will then begin its return movement to its remote position clear of a record on the turntable under influence of the reversal of lever 60. As the magazine begins its return movement, the lowermost record tablet therein will be engaged by the finger 31 protruding through cutaway 38 and will be dislodged from flanges 40 and 41 through cutaway 39 and the open bottom of the magazine to playing position on the turntable.

As the magazine approaches its remote position, the lug 53 on the lever 42 will reach the other end of the slot 52, causing the arms 17 and 18 to be again shifted to position beneath that of a record on the turntable.

During the cycle of movements of the record transfer mechanism, the mechanism for returning the tone arm to playing position in the outermost turn of the record groove, after it has rotated to its remote position from the turntable, operates under the influence of the movements of the elevator shaft 19 to which it is related as follows:

Throughout the entire playing of the record, the lever 107 is held in its full line position as shown in Fig. 12, or in other words, in position to stop the tone arm in initial playing position, by means of arm 112 which is then in its lowermost position, the elevator shafts 19 being down. The arm 112 during this time is in full line position as shown in Fig. 12 and abuts the end of an extension 119 formed on arm 120 of lever 107.

When the tone arm is raised off the record at the completion of its reproduction, and before it completes its swing clear thereof, the carriage 113, together with elevators 19 and 20, is raised by operation of cams 57 sufficiently to permit arm 112 to disengage itself from the extension 119, permitting the lever 107 to swing under influence of the spring 110 to dotted line position for stopping the tone arm in its remote position clear of the turntable and a record thereon.

To this end, cams 57 have a slight rise 121 preceding the rise 118 of sufficient height to effect this disengagement but not high enough to raise the elevators to a position where there will be interference with rotation of the tone arm to its remote position. When the elevators are so raised, it will be noted that the extension 119 moves toward the turntable while the arm 112 remains in full line position as shown in Fig. 12 until the elevators have been raised to their upper limit.

When the elevators are rotated to off position for disengagement of arms 17 and 18 from the record to deposit the same, arm 112 is also rotated to position above and between the position of the end of extension 119 and the turntable, and when the pins 19 and 20 have been lowered with arms 17 and 18 in this off position, arm 112 will also be lowered and will engage the end of extension 119, and upon the subsequent rotation of arms 17 and 18 to position beneath a record newly deposited on the turntable, lever 107 will be rotated by arm 112, bringing the tone arm to playing position as indicated above, after which the engaging end of lever 98 will ride off of ridge 99 into notch 101 permitting the lowering of the tone arm for bringing the stylus into the outermost groove of the record newly deposited upon the turntable.

At the same time, the end of branch arm 102 will drop into notch 103 from which it was raised at the beginning of the cycle, having ridden throughout the cycle upon the ridge 104 and preventing, thereby, the movement of the dog 83 into the path of the crescent 79. When, however, the arm 102 drops into this notch, the dog 83 will, simultaneously therewith, drop into the path of the crescent, disengaging the clutch members and stopping the cycle of operations for transferring records between the magazine and turntable as described above.

Steps in the cycle of operations for transferring records from the turntable to the magazine and from the magazine to the turntable are illustrated in Figs. 6 to 9 inclusive, Fig. 6 showing a record as held in elevated position prior to passing of the magazine to a position thereunder and coaxial with the turntable, Fig. 7 showing the magazine positioned beneath the elevated record and in position to receive the same, Fig. 8 showing the record deposited within the magazine and the finger 31 about to dislodge a bottom record from the magazine onto the turntable, and Fig. 9 showing the record partly dislodged.

It will be clear, from a study of Figs. 6–9, that, should it be desired to repeatedly play a single record without intervention of other records, this result can be obtained by removing all other records from the magazine and turntable, whereupon, after the record to be so repeatedly played has been played, elevated by the arms 17 and 18 and deposited thereby into the magazine, the record will, during the return movement of the magazine to its remote position, be dislodged from the magazine onto the turntable; and so as often as it is desired to repeat the playing thereof.

It will also appear that a minimum of time will elapse between the removal of a record from and the supply of a subsequent one to the turntable during the transfer cycle.

It will further appear that the record magazine itself actively cooperates with other mechanism of the machine to effect the various transfers of records between the magazine and the turntable.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a machine of the character described, a turntable, a magazine including a vertical surrounding wall and having a travel to and from position for discharging a record onto the turntable, said magazine having an open bottom and oppositely positioned record supporting ledges extending from said wall, said wall having oppositely positioned cutaways between said ledges, and a finger positioned in the path of travel of said cutaways to contact with a record for dislodging the same through one of the cutaways onto the turntable.

2. In a machine of the character described, a turntable, a magazine movable to and from position over the turntable, said magazine having surrounding wall provided with oppositely positioned notches in the lower edge thereof and a finger positioned in the path of travel of said notches and yieldably mounted to permit movement of the magazine thereover.

3. In a machine of the character described, a turntable, a magazine movable in a horizontal plane above said turntable to and from position to receive a record from the turntable, and means for removing a record from the turntable, said means being rotatable to release the record to permit delivery thereof into said magazine.

4. In a machine of the character described, a turntable, a magazine movable to and from a position adjacent the turntable, elevator means for lifting a record from the turntable and means operable to withdraw the elevator means from the record whereby the record is deposited in the magazine when the latter is adjacent the turntable.

5. In a phonograph machine, a turntable, a record magazine mounted for swinging movement about a pivot to and from a position adjacent the turntable, members movable from below the position of a record tablet on the turntable to a position from which a record may be deposited into the top of the magazine, said members having record supporting arms extending laterally therefrom, and means for rotating said supports when in said last named position for withdrawing the arms from beneath a record.

6. In a phonograph machine, a turntable, a record magazine mounted for swinging movement about a pivot to and from a position adjacent the turntable, members movable from a lower position below a record tablet on the turntable to an upper position from which a record may be deposited into the top of the magazine, said members having record supporting arms extending laterally therefrom, and means for rotating the members in said lower position for engaging the arms beneath a record and in said upper position for disengaging the arms from the record to permit discharge thereof into the magazine.

7. In a phonograph machine, a turntable, a record magazine movable from a position clear of the turntable to a position coaxial therewith and back to said first named position, elevators having arms turnable to position beneath a record on the turntable, said elevators being vertically slidable from a position below a record on the turntable to a position above the plane of the magazine and rotatable to discharge a record, means synchronizing the movements of the elevators and magazine so that the elevators are rotated to bring the arms beneath a record and elevated before the magazine is moved to position coaxial with the turntable and rotated after the magazine is in said position to withdraw the arms from beneath the record.

8. In a device of the character described, a turntable, a magazine movable from a position remote from said turntable to a position substantially coaxial therewith, elevating means for raising a record from the turntable to a position above the plane of the magazine, and means for causing the elevating means to release the record when in said raised position for discharge thereof in said magazine.

9. In a device of the character described, a turntable, a magazine movable to and from a position coaxial with the turntable, elevating means for raising a record from the turntable to a position above the plane of the magazine, means for operating the elevating means when the magazine is in said coaxial position to discharge the record into the magazine, and means for dislodging a record from the bottom of the magazine onto the turntable coincident with a portion of the movement of the magazine.

10. In a device of the character described, a turntable, a record magazine movable to and from position coaxial with said turntable, elevating means adjacent the turntable including supports adapted to be extended in a plane transversely of the plane of a record on the turntable, said supports having a travel from a position beneath a record placed on the turntable to a position above the plane of the magazine to elevate and support the record in elevated position, said supports also being movable to be withdrawn from supporting relation with the record when in said elevated position above the magazine.

11. In a device of the character described, a turntable, a record magazine pivoted to swing to and from a position coaxial with the turntable, supporting means having a travel relative to the turntable from below the position of a record thereon to a position above the plane of the magazine, said supporting means being also movable to a position beneath the record, means for raising the supporting means, magazine control means for moving the magazine to and from position coaxial with the turntable, and means operable when the magazine is in said coaxial position for removing the supports from beneath a record, said last named means being operated by said control means after the magazine has been brought to said position coaxial with the turntable.

12. In a device of the character described, a turntable, a record magazine, elevators provided with supports and having a travel parallel with the axis of the turntable, said elevators being movable to position the supports beneath a record and for withdrawing them from said position, means for raising the elevators, means for swinging the magazine to and from a position coaxial with the turntable, and means for moving the elevators from supporting position controlled by said last named means and timed to operate when the magazine is in coaxial alignment with the turntable.

13. In a device of the character described, a turntable, a record magazine pivoted to swing to and from position coaxial with the turntable, record elevators movable from position beneath a record on the turntable to a position above the plane of the magazine, record supports on the elevators rotatable therewith to positions of support and non-support, and means operable to rotate said supports to non-support position when the magazine is in coaxial relation with the turntable and the supports are in a plane above that of the magazine.

14. In a device of the character described, a turntable, a record magazine movable to and from position above the turntable, supporting means rotatable to and from position beneath a record positioned coaxially above the turntable, means for elevating the supporting means above the plane of the magazine, means for then moving the magazine to a position coaxial with the turntable, and means controlled by the last named means for rotating said supporting means from beneath the record when the magazine is in position above the turntable.

15. In a device of the character described, a turntable, a record magazine movable horizontally to and from position above said turntable, elevator means including supporting means movable axially of the turntable, for elevating a record thereon to a plane above the plane of movement of said magazine, and means for moving said supporting means to and from position beneath said record at the limits of axial movement.

16. In a device of the character described, a turntable, a record magazine movable to and from position above the turntable, elevator means including supporting means movable axially of the turntable and having means for moving said supporting means to and from position beneath a record on the turntable, and a single means for controlling the movements of the magazine and of the supporting means to and from position beneath a record above the turntable.

17. In a device of the character described, a turntable, a magazine movable in a plane above the turntable to and from position to receive a record from the turntable, supporting means for lifting a record from the turntable and elevating the same above the plane of the magazine, and means for withdrawing the supporting means when above the plane of the magazine, the movements of the supporting means being synchronized with those of the magazine so as to deliver a record from the supporting means to the magazine when the latter is in record receiving position.

18. In a device of the character described, a turntable, a magazine movable to and from position to receive a record from the turntable, supporting means for removing a record from the turntable and elevating it to a position above the magazine, a control lever yieldably connected with the magazine for moving the magazine to and from said position, and a member operable by said control lever after the magazine is in record receiving position for withdrawing said supporting means from supporting relation with the record.

19. In a device of the character described, a turntable, a record magazine movable to and from position to receive a record from said turntable, means for delivering a record from the turntable to the magazine, and means for moving the magazine to and from said position including two members having a yielding connection, one of said members constituting a control and being movable beyond its position for placing the magazine in said record receiving position, additional movement thereof being effective to cause the record delivering means to operate.

20. In a device of the character described, a turntable, a record magazine movable to position to receive a record from the turntable, means for delivering a record from the turntable to the magazine, means operable to move the magazine to said position, and means operable by the second named means with a delayed movement for causing said first named means to operate.

21. In a device of the character described, a turntable, a magazine movable to and from position to receive a record from said turntable, rotatable means for delivering a record from the turntable to the magazine, link mechanism including an extensible member for moving the magazine to and from said position, a mechanism for rotating the rotatable means for discharge of a record, and means for operating said link mechanism and for operating said last named mechanism with delayed movement relative to the operation of the link mechanism.

22. In a device of the character described, a turntable, a record magazine disposed in a plane above that of the turntable, and means for elevating records off the turntable to a position above the plane of the magazine and withdrawable for discharge of the elevated record into the magazine.

23. In a device of the character described, a turntable, a magazine, elevator means positioned adjacent the turntable having supports thereon, means for rotating said elevator means to position beneath a record on said turntable, and means for raising said elevator means above the plane of the magazine, said second named means being adapted to reversely rotate the elevator means for releasing said record into the magazine when the elevator means is raised above the plane of the magazine.

24. A device of the character described having a turntable, a magazine movable in a single plane to and from position of coaxial alignment with the turntable, elevating means operable to raise a record from said turntable and movable from a position below to a position above the plane of the magazine, said means being operable to release a record into said magazine from its elevated position, and means for operating the elevating means for releasing the record to permit discharge thereof into the magazine when the magazine is in position coaxially above the turntable.

25. In a machine of the character described, a turntable, a magazine movable to and from a position above the turntable, said magazine having a surrounding wall provided with a pair of openings, and a finger adapted to project through one of said openings to dislodge a record through the other of said openings upon movement of said magazine away from said turntable.

26. In a machine of the character described, a turntable, a magazine movable in a horizontal plane above said turntable to and from position to receive a record from the turntable, and means for removing a record from the turntable, said means being movable relative to the magazine to deliver the record into said magazine.

27. In a device of the character described, a turntable, elevator means including supporting means movable axially of the turntable, and means for moving said supporting means to and from position beneath a record on the turntable at the limits of axial movement.

28. In a machine of the character described, a turntable, a magazine movable in a horizontal plane above said turntable to and from position to receive a record from the turntable, and means for removing a record from the turntable, said means being independent of said magazine and being movable relative to the magazine to deliver the record into said magazine.

29. In a machine of the character described, a turntable, a magazine movable in a horizontal plane above said turntable to and from position to receive a record from the turntable and means for removing a record from the turntable, said means being movable at right angles to the plane of movement of said magazine to deliver the record into said magazine.

30. In a machine of the character described, a turntable, a magazine movable in a horizontal plane above said turntable to and from position to receive a record from the turntable, and means for removing a record from the turntable, said means being movable to a position above said magazine to deliver the record into said magazine.

31. In a machine of the character described, a turntable, a magazine movable in a horizontal plane above said turntable to and from position to receive a record from the turntable, and means for removing a record from the turntable, said means being movable from a position below the turntable to a position above said magazine to deliver the record into said magazine.

WILLIAM D. LA RUE.